United States Patent
Fontaine et al.

(10) Patent No.: US 7,826,971 B2
(45) Date of Patent: Nov. 2, 2010

(54) METHOD FOR REDUCING NUISANCE ALARMS FOR ANTI-COLLISION WITH OBSTACLES ON AIRCRAFT

(75) Inventors: Sylvain Fontaine, Villeneuve Tolosane (FR); Nicolas Marty, Saint Sauveur (FR); Pierre Gamet, Blagnac (FR)

(73) Assignee: Thales (FR)

( * ) Notice: Subject to any disclaimer, the term of this patent is extended or adjusted under 35 U.S.C. 154(b) by 492 days.

(21) Appl. No.: 12/047,633

(22) Filed: Mar. 13, 2008

(65) Prior Publication Data
US 2009/0125236 A1    May 14, 2009

(30) Foreign Application Priority Data
Mar. 13, 2007   (FR) ................................... 07 01796

(51) Int. Cl.
*G08G 1/16*    (2006.01)
(52) U.S. Cl. .................. 701/301; 701/3; 701/7; 701/9; 342/146; 342/454; 342/455; 340/945; 340/969
(58) Field of Classification Search .......... 701/3, 701/301, 7–9; 342/29, 46, 455, 146, 147, 342/450, 454; 340/945, 969, 970
See application file for complete search history.

(56) References Cited

U.S. PATENT DOCUMENTS

| | | | |
|---|---|---|---|
| 5,414,631 A | | 5/1995 | Denoize et al. |
| 5,488,563 A | | 1/1996 | Chazelle et al. |
| 5,638,282 A | * | 6/1997 | Chazelle et al. ............. 701/301 |
| 5,677,842 A | | 10/1997 | Denoize et al. |
| 6,088,654 A | | 7/2000 | Lepere et al. |
| 6,317,663 B1 | | 11/2001 | Meunier et al. |
| 6,480,120 B1 | | 11/2002 | Meunier |
| 7,006,032 B2 | * | 2/2006 | King et al. ..................... 342/29 |
| 7,212,918 B2 | * | 5/2007 | Werback ..................... 701/120 |

(Continued)

FOREIGN PATENT DOCUMENTS

BR    200516330 A  *  9/2008

(Continued)

OTHER PUBLICATIONS

A new on-ground-measurement technique for farfield evaluation and possible phased array effects of an aircraft fuselage Geise, R.; Schuur, J.; Schwark, M.; Schmidt, I.; Enders, A.; Antennas and Propagation, 2009. EuCAP 2009. 3rd European Conference on; Publication Year: 2009 , pp. 2171-2174.*

(Continued)

*Primary Examiner*—Cuong H Nguyen
(74) *Attorney, Agent, or Firm*—Lowe Hauptman Ham & Berner, LLP

(57) ABSTRACT

A method for filtering anti-collision alarms for aircraft, the said aircraft comprising means for calculating its speed and extrapolated positions on its trajectory, the said extrapolated positions being calculated over a fixed maximum time period, called extrapolation time, and a topographical database of the terrain, the said database comprising, within a given perimeter, data on the density of obstacles, comprises a calculation of a weighting coefficient for the extrapolation time of the calculated extrapolated trajectories of the aircraft as a function of the density of obstacles within a surface area included within the perimeter.

11 Claims, 8 Drawing Sheets

U.S. PATENT DOCUMENTS

| | | | |
|---|---|---|---|
| 7,262,730 B2 * | 8/2007 | Larsson et al. | 342/29 |
| 7,349,774 B2 * | 3/2008 | Werback | 701/3 |
| 7,414,567 B2 * | 8/2008 | Zhang et al. | 342/29 |
| 7,554,482 B2 * | 6/2009 | Smith et al. | 342/29 |
| 7,583,223 B2 * | 9/2009 | Brandao et al. | 342/30 |
| 7,612,716 B2 * | 11/2009 | Smith et al. | 342/454 |
| 7,667,647 B2 * | 2/2010 | Breen et al. | 342/450 |
| 7,724,178 B2 * | 5/2010 | Brandao et al. | 342/29 |
| 7,782,256 B2 * | 8/2010 | Smith | 342/453 |
| 7,786,922 B2 * | 8/2010 | Stayton et al. | 342/30 |
| 2005/0156777 A1 * | 7/2005 | King et al. | 342/29 |
| 2007/0031007 A1 | 2/2007 | Bitar | |
| 2007/0078591 A1 | 4/2007 | Meunier et al. | |
| 2007/0078592 A1 | 4/2007 | Meunier et al. | |
| 2007/0088492 A1 | 4/2007 | Bitar et al. | |
| 2007/0129855 A1 * | 6/2007 | Coulmeau | 701/3 |
| 2007/0150117 A1 | 6/2007 | Bitar et al. | |
| 2007/0150121 A1 | 6/2007 | Bitar et al. | |
| 2007/0174005 A1 | 7/2007 | Bitar et al. | |
| 2007/0187554 A1 | 8/2007 | Bitar et al. | |
| 2007/0215745 A1 | 9/2007 | Fleury et al. | |
| 2007/0219705 A1 | 9/2007 | Bitar et al. | |
| 2007/0250223 A1 | 10/2007 | Francois et al. | |
| 2007/0276553 A1 | 11/2007 | Bitar et al. | |
| 2007/0285283 A1 | 12/2007 | Bitar et al. | |
| 2008/0004801 A1 | 1/2008 | Bitar et al. | |
| 2008/0039984 A1 | 2/2008 | Bitar et al. | |
| 2008/0046171 A1 | 2/2008 | Bitar et al. | |
| 2008/0288169 A1 * | 11/2008 | Meunier et al. | 701/301 |
| 2008/0306639 A1 * | 12/2008 | Fleury et al. | 701/7 |
| 2009/0076728 A1 * | 3/2009 | Bouchet et al. | 701/301 |
| 2010/0100326 A1 * | 4/2010 | Nouvel et al. | 701/301 |

FOREIGN PATENT DOCUMENTS

| | | |
|---|---|---|
| DE | 69307377 E * | 2/1997 |
| EP | 565399 A1 * | 10/1993 |
| EP | 0 655 699 | 5/1995 |
| EP | 2161197 A1 * | 3/2010 |
| FR | 2 723 219 | 2/1996 |
| FR | 2 813 963 | 3/2002 |
| FR | 2 842 594 | 7/2002 |
| FR | 2 848 661 | 12/2002 |
| FR | 2 860 292 | 9/2003 |
| FR | 2 864 270 | 12/2003 |
| FR | 2 864 312 | 12/2003 |
| FR | 2 867 851 | 3/2004 |
| FR | 2 868 835 | 4/2004 |
| FR | 2913800 A1 * | 9/2008 |
| FR | 2932279 A1 * | 12/2009 |
| WO | WO 2006051220 A1 * | 5/2006 |

OTHER PUBLICATIONS

Propagation measurements inside different civil aircrafts and comparison with EM techniques; Moraitis, N.; Constantinou, P.; Fontan, F.P.; Valtr, P.; Antennas and Propagation, 2009. EuCAP 2009. 3rd European Conference on; Publication Year: 2009 , pp. 887-891.*

A novel fault diagnosis method design and application for civil aircraft system; Yongqi Chen; Zhiguang Zhong; Automation and Logistics, 2009. ICAL '09. IEEE International Conference on; Digital Object Identifier: 10.1109/ICAL.2009.5262684 Publication Year: 2009 , pp. 1643-1647.*

Solving Aircraft-Sequencing Problem Based on Bee Evolutionary Genetic Algorithm and Clustering Method; Siliang Wang; Dependable, Autonomic and Secure Computing, 2009. DASC '09. Eighth IEEE International Conference on; Digital Object Identifier: 10.1109/DASC.2009.26; Publication Year: 2009 , pp. 157-161.*

Aircraft EMP hardening specifications and measurement methods; Prather, W.; Electromagnetic Compatibility, 2008. EMC 2008. IEEE International Symposium on; Digital Object Identifier: 10.1109/ISEMC.2008.4652197; Pub. Year: 2008 , pp. 1-1.*

Lateral flight control design for a highly flexible aircraft using a nonsmooth method; Simoes, A.M. et al.; Decision and Control, 2009 held jointly with the 2009 28th Chinese Control Conference. CDC/CCC 2009. Proceedings of the 48th IEEE Conference on; Digital Object Identifier: 10.1109/CDC.2009.5400576; Publication Year: 2009 , pp. 696-701.*

Asymptotic Tracking for Aircraft via Robust and Adaptive Dynamic Inversion Methods; MacKunis, W.; Patre, P. M.; Kaiser, M. K.; Dixon, W. E.; Control Systems Technology, IEEE Transactions on; vol. PP , Issue: 99; Digital Object Identifier: 10.1109/TCST.2009.2039572; Publication Year: 2010 , pp. 1-9.*

Study on the Model for Horizontal Escape Maneuvers in TCAS ; Liangfu Peng; Yunsong Lin; Intelligent Transportation Systems, IEEE Transactions on; vol. 11 , Issue: 2; Digital Object Identifier: 10.1109/TITS.2010.2044790; Publication Year: 2010 , pp. 392-398.*

Exploration of new algorithms for airborne collision detection and avoidance to meet NextGen capabilities; Chamlou, R.; Love, W.D.; Moody, C.; Digital Avionics Systems Conference, 2008. DASC 2008. IEEE/AIAA 27$^{th}$ ; Digital Object Identifier: 10.1109/DASC.2008.4702789; Publication Year: 2008 , pp. 2.D.5-1-2.D.5-13.*

Future airborne collision avoidance—Design principles, analysis plan and algorithm development; Chamlou, R.; Digital Avionics Systems Conference, 2009. DASC '09. IEEE/AIAA 28$^{th}$ ; Digital Object Identifier: 10.1109/DASC.2009.5347434 Publication Year: 2009 , pp. 6.E.2-1-6.E.2-17.*

TCAS solution for low altitude flights; Lin, C.E.; Yi-Yu Wu; Integrated Communications Navigation and Surveillance Conference (ICNS), 2010; Digital Object Identifier: 10.1109/ICNSURV.2010.5503240; Publication Year: 2010 , pp. I4-1-I4-9.*

Modeling and simulation of Traffic Alert and Collision Avoidance System; Yuan Wenduo; Song Dong; Industrial Electronics and Applications, 2009. ICIEA 2009. 4th IEEE Conference on; Digital Object Identifier: 10.1109/ICIEA.2009.5138680 Publication Year: 2009 , pp. 2612-2615.*

Transmit power of interrogations controlling method in TCAS; Lin Yunsong; Peng Liangfu; Control and Decision Conference, 2009. CCDC '09. Chinese; Digital Object Identifier: 10.1109/CCDC.2009.5195098; Publication Year: 2009 , pp. 289-294.*

U.S. Appl. No. 11/912,243, filed Oct. 22, 2007, Fabre et al.
U.S. Appl. No. 12/092,798, filed May 6, 2008, Meunier et al.
U.S. Appl. No. 12/118,128, filed May 8, 2008, Subelet et al.
U.S. Appl. No. 12/092,897, filed May 7, 2008, Subelet et al.
U.S. Appl. No. 11/683,989, filed Mar. 8, 2007, Lorido et al.
U.S. Appl. No. 11/870,338, filed Oct. 10, 2007, Deker et al.
U.S. Appl. No. 11/963,753, filed Dec. 21, 2007, Bitar et al.
U.S. Appl. No. 12/016,979, filed Jan. 18, 2008, Marty et al.
U.S. Appl. No. 12/030,392, filed Feb. 13, 2008, Sallier et al.
U.S. Appl. No. 12/047,885, filed Mar. 13, 2008, Fleury et al.
U.S. Appl. No. 12/047,633, filed Mar. 13, 2008, Fontaine et al.
U.S. Appl. No. 12/118,129, filed May 9, 2008, Marty et al.
U.S. Appl. No. 11/575,969, filed Mar. 24, 2007, Bitar et al.

* cited by examiner

US 7,826,971 B2

METHOD FOR REDUCING NUISANCE ALARMS FOR ANTI-COLLISION WITH OBSTACLES ON AIRCRAFT

RELATED APPLICATIONS

The present application is based on, and claims priority from, French Application Number 07 01796, filed Mar. 13, 2007, the disclosure of which is hereby incorporated by reference herein in its entirety.

FIELD OF THE INVENTION

The present invention relates to the field of anti-collision methods for aircraft and, more particularly, it relates to aircraft comprising a preventative function for detection of collision with obstacles aimed at preventing aviation accidents in which an aircraft being still maneuverable crashes into the ground or into an obstacle despite, in some cases, the prior presence of warnings and alarms.

BACKGROUND OF THE INVENTION

This type of accident is known in the technical literature under the acronym CFIT for "Controlled Flight into Terrain". Whereas, in the past, they formed a large proportion of aviation disasters, accidents of the CFIT type are nowadays mostly avoided thanks to ground avoidance maneuvers carried out by crews being prompted by warnings and alarms generated by on-board automatic systems for warning of risks of collision with the ground and with obstacles known under the acronym TAWS (Terrain Awareness & Alerting Systems), of which the GCAS (Ground Collision Avoidance System) system and the $T^2CAS$ (Terrain & Traffic Collision Avoidance System) system, developed and marketed by the Thales company, form part.

The instruction given to an aircraft crew confronted with a risk of collision with the ground or with obstacles is to undertake an avoidance manoeuvre in accordance with a pre-defined avoidance procedure which corresponds to a purely vertical avoidance manoeuvre referred to as 'Pull-Up', consisting in climbing using the best performance parameters of the aircraft, a manoeuvre referred to as 'standard avoidance manoeuvre' or, alternatively, SVRM (Standard Vertical Recovery Manoeuvre).

On-board equipment warning automatically of flight situations leading to risks of collision with the ground and with obstacles, sufficiently in advance for an appropriate avoidance manoeuvre to be effective, have been developed in recent years. Amongst these systems, the TAWS systems offer the best performance since they make use of a function referred to as FLTA (Forward-Looking Terrain Avoidance) which looks in front of the aircraft along and below its trajectory, vertically and laterally, if there is a potential risk of collision with the ground or with obstacles.

The principle of TAWS systems is based on the monitoring of the penetration of the ground and the obstacles into one or more protection volumes associated with the aircraft using a modelling of the terrain overflown. The hills and mountains of the region overflown are stored in a digital map accessible to the aircraft. The position of the aircraft with respect to the region overflown is supplied by flight equipment such as: inertial guidance system, satellite positioning receiver, baro-altimeter, radio-altimeter or a combination between several of these sensors. The protection volumes associated with the aircraft are advantageously defined in such a manner as to contain a modelling of the standard vertical avoidance manoeuvre trajectory undertaken with a variable delay starting from the trajectory followed by the aircraft predicted from the flight parameters delivered by the flight equipment of the aircraft, assuming that the aircraft maintains its ground velocity vector or its trajectory. In general, there are two protection volumes, of staged sizes, associated with the aircraft, the most forward one being used in order to give a substantial warning to the crew of the aircraft that the trajectory followed will need to be modified in the medium term in order to avoid the ground, and the nearest one being used in order to give a substantial alarm to the crew of the aircraft that they must effectively urgently undertake a vertical avoidance manoeuvre.

For more details on the concepts implemented in TAWS systems, reference may be advantageously made to the U.S. Pat. No. 5,488,563, U.S. Pat. No. 5,414,631, U.S. Pat. No. 5,638,282, U.S. Pat. No. 5,677,842, U.S. Pat. No. 6,088,654, U.S. Pat. No. 6,317,663, U.S. Pat. No. 6,480,120 and to the French Patent applications FR 2.813.963, FR 2.842.594, FR 2.848.661, FR 2.860.292, FR 2.864.270, FR 2.864.312, FR 2.867.851, FR 2.868.835.

However, an operational nuisance potentially generated by such systems is the occurrence of a spurious alert associated with an erroneous evaluation of the situation of the aircraft relative to the ground and the surrounding obstacles.

There is therefore a need in operational TAWS systems for an adaptation of the alarm triggering logic in flight situations for which the conventional methods are maladapted because of the particular local configuration of the obstacles. This could be an urban environment, for example, comprising numerous obstacles.

SUMMARY OF THE INVENTION

The method according to the invention relates to the filtering of anti-collision warnings under such conditions. It is applicable in the case of detection of obstacles not constituting a real and/or imminent danger but nevertheless generating alarms which represent a distraction for the crew.

The structuring of the database used for the predictive modes of the "FLTA" type comprising data relating to the obstacles, of the height of the obstacles and/or number of obstacles per unit surface area type, can be similar to the structuring of the terrain data of a TAWS function. For this reason, the hierarchical arrangement of the data and the search by geographic localization are substantially identical to the functions specific to the TAWS.

In an urban environment or an environment comprising numerous obstacles, the current functions do not allow a level of danger adapted to the flight context to be returned, notably owing to the large number of warnings emitted due to the numerous detections of obstacles. More particularly, these functions are maladapted in intra-urban flight missions that may notably be undertaken by helicopters for VIP transport, road traffic surveillance, policing or emergency support.

Undertaking this type of mission with the equipment currently available on the market is recognized to be frequently subject to spurious detections of erroneous alert situations, thus generating an audible nuisance for the crew with significant operational consequences. In the worst cases, this causes the pilot to disconnect the surveillance device thus reducing the safety level of the mission.

One solution currently proposed by equipment on the market consists in simply recommending in the flight manual the temporary or definitive cancelling of the audible alarms that occur.

At the present time, one way of detecting obstacles consists in correlating the extrapolation of a trajectory of the aircraft over a short time period, for example two minutes, and obstacle data referenced in a database of the aircraft.

The extrapolated trajectories are calculated, in the current systems, within a target cone whose origin is the aircraft and which is substantially centred on the heading at a given moment in time.

Generally speaking, the range of the extrapolated trajectory is essentially designed for an aircraft of the airplane type flying in a non-urban environment.

For this reason, a major drawback of the current solutions resides in the nuisance caused by the emission of numerous irrelevant or erroneous alerts transmitted to the crew in contexts comprising numerous obstacles, notably a built-up area, that do not necessarily constitute an immediate danger for aircraft, notably of the helicopter type.

The method according to the invention allows the range of the extrapolated trajectories to be adjusted notably as a function of the density of obstacles on the terrain situated in front of the aircraft. It is therefore appropriate to aircraft of the helicopter type flying within an urban context.

One aim of the invention is notably to overcome the aforementioned drawbacks. For this purpose, the object of the invention is to reduce the range of the extrapolated trajectories of the aircraft by applying weighting coefficients to the range of these trajectories according to contexts that may or may not be associated with the aircraft, such as the density of obstacles within a given perimeter, its ground speed, its rate of changes of heading within a given time period, its weight, its altitude or its height.

More precisely, the subject of the invention is a method for filtering anti-collision alarms for aircraft, the said aircraft comprising
  means for calculating the speed of the aircraft;
  means for calculating the trajectory and positions extrapolated from the trajectory of the aircraft, the said extrapolated positions being calculated for a fixed maximum time period, called extrapolation time;
  and a topographical database of the terrain and of obstacles, the said database comprising, within a given perimeter, obstacle density data.

The method advantageously comprises the calculation of a weighting coefficient for the extrapolation time of the extrapolated trajectories of the aircraft as a function of the density of obstacles within the given perimeter.

Advantageously, the height of the obstacles considered for the weighting calculation is greater than a pre-determined minimum height.

Advantageously, the trajectory extrapolated over the extrapolation time of the aircraft comprises an estimation of at least three successive positions of the aircraft, of which a first position is determined by considering a first fixed time $T_{REACTION}$ for reaction of the crew, a ground speed of the aircraft and at a first heading, a second position is determined as a function of a second period of time $T_{PULL-UP}$ required in order to change the first heading of the aircraft towards a second heading and, finally, a third position at a fixed heading for a climb duration $T_{CLIMB}$.

Advantageously, when an upper threshold for the density of obstacles is exceeded, a reduced climb duration is calculated from the product of the weighting coefficient and the climb duration $T_{CLIMB}$.

Advantageously, the weighting coefficient is a function of the ground speed of the aircraft.

Advantageously, the weighting coefficient is a function of the differences in vertical speeds of the aircraft observed within a second fixed time period.

Advantageously, the second time period is around twenty seconds.

Advantageously, the weighting coefficient is a function of the height of the aircraft with respect to the ground.

Advantageously, the weighting coefficient is a function of the proximity of reference positions of obstacles identified from the topographical database.

Advantageously, the reduced duration $T_{CLIMB\_REDUCED}$ is expressed in the following manner:

$T_{CLIMB\_REDUCED} = C \cdot T_{CLIMB}$, where C is the weighting coefficient.

Advantageously, the weighting coefficient C for the reduced duration $T_{CLIMB\_REDUCED}$ is expressed in the following manner:

$$C = \left[\left(\prod_{i=1}^{n}(1+C_i)^{\alpha_i}\right)\frac{1}{\sum_{i=1}^{n}\alpha_i}-1\right]$$

where the coefficients $C_i$ are coefficients in the range between 0 and 1, relating to each parameter taken into account for weighting the third time period ($T_{CLIMB}$), and the coefficients $\alpha_i$ are powers applied to each of the normalized coefficients which relate to the importance of the influence of a parameter that it is desired to favour with respect to the other parameters.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE DRAWINGS

Figure 1A:
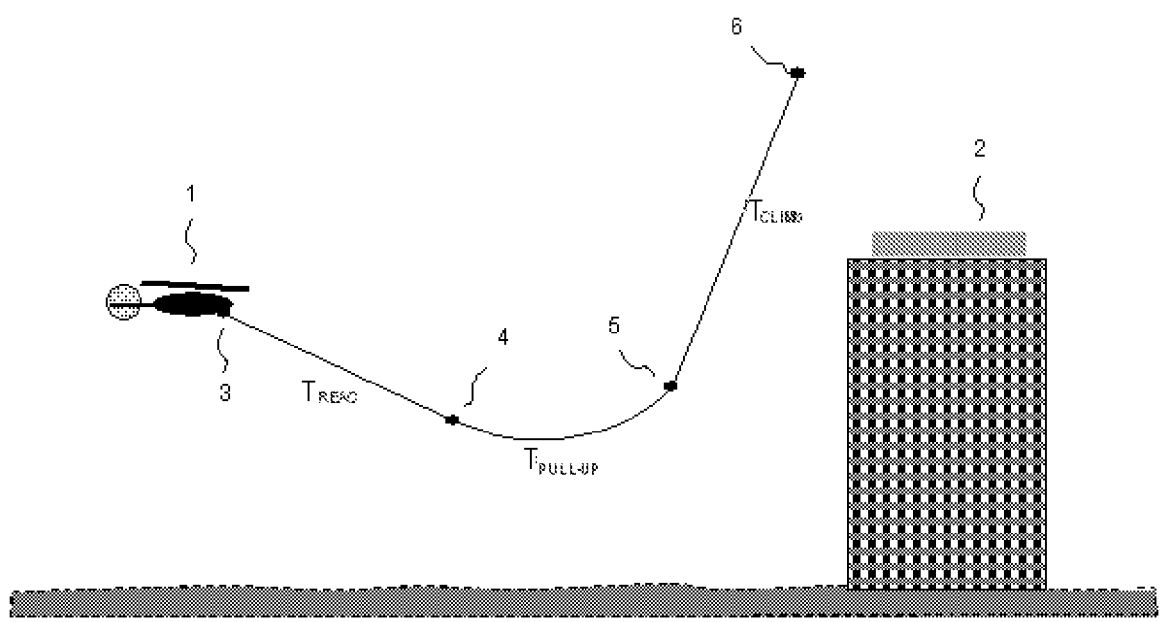
FIG. 1A: the extrapolated trajectory of an aircraft.

FIG. 1A shows a diagram of an aircraft 1 flying with a ground speed from which a computer allows the possible trajectory of the aircraft during a vertical manoeuvre for avoiding an obstacle 2 to be generated and to be predicted. In the following, the ground speed of the aircraft will be denoted as the horizontal flying speed of the aircraft with respect to the earth.

One example of calculated trajectory is decomposed into three parts being two segments and a curve. A first segment, formed by a first position 3 representing the nose of the aircraft and a second position 4, represents the trajectory of the aircraft according to its instantaneous heading and ground speed, this portion of the trajectory being calculated over a fixed time period. This first time period is denoted $T_{REAC}$, which can be 20 seconds for example. A second part of the trajectory represents the curve of the trajectory allowing the aircraft to be flown from the second position 4 towards a third position 5. This trajectory corresponds to the trajectory followed over a given fixed time period, denoted $T_{PULL-UP}$, required for the aircraft to get into a climb situation. The third segment represents, at constant heading, the flight of the aircraft in a climb over a fixed time period, denoted $T_{CLIMB}$, considering the instantaneous speed of the aircraft. This segment begins from the climb start position 5 as far as the last calculated position 6 of the trajectory.

The times $T_{REAC}$, $D_{PULL-UP}$, $D_{CLIMB}$ are generally fixed irrespective of the topology of the terrain overflown or of the conditions outside the aircraft; the sum of these times is called the extrapolation time.

This trajectory is currently established in some aircraft in order to know the situation and the positioning of the aircraft within a near timeframe so as to warn the crew of an imminent danger. The extrapolated trajectory is thus continually calculated and compared to a database of obstacles. Alerts are then emitted in order to warn the crew of the presence of one or more obstacle(s) in view, on at least one of the extrapolated trajectories. Generally speaking, the margin $T_{REAC}$ creates a reaction time delay for the crew to undertake an avoidance manoeuvre.

The method according to the invention allows the value of the duration $T_{CLIMB}$, corresponding to the time required to cover the third segment of the extrapolated trajectory, to be adjusted. This adjustment is notably carried out as a function of a variable representing the density of obstacles. Thus, the invention allows several flight modes or configurations of the aircraft to be obtained depending on the topology of the terrain located in front of the aircraft.

For this purpose, a database, comprising terrain topographical information together with the structuring of the obstacle description data, comprises for example the following parameters:

threshold values D[i], i=1 to N, defining the number of obstacles per unit surface area;

threshold values H[i], i=1 to N, defining the height above the ground of the obstacles.

The data are arranged in a hierarchy, for example in the form of an N-ary tree, one example of which is detailed hereinafter, in order to enable a search by localization from the geographical accesses. This hierarchical arrangement of the data is used in the structuring of the terrain data within the framework of the TAWS function of certain existing products, such as the T²CAS developed and marketed by THALES.

The leaves of the N-ary tree correspond to the last level of decomposition and contain:

the list of the indices of the obstacles included within one area or situated at their intersections. The indices reference the position of the obstacle within a collection;

the number O of obstacles included within one area or situated at their intersections;

the surface area S of the area in question: this surface area may be expressed in m², km² or Nm² or any other usual unit;

the density of obstacles per unit surface area, resulting from the ratio of the two previously defined values.

Advantageously, the invention proposes the inclusion, within the description of the area, of a Boolean typing T[i] (i=1 . . . N) of an area or of a set of areas representing the density of obstacles such that T[i]=TRUE if the number of obstacles of height greater than H[i], within the area in question, is greater than D[i].

Figure 1B:
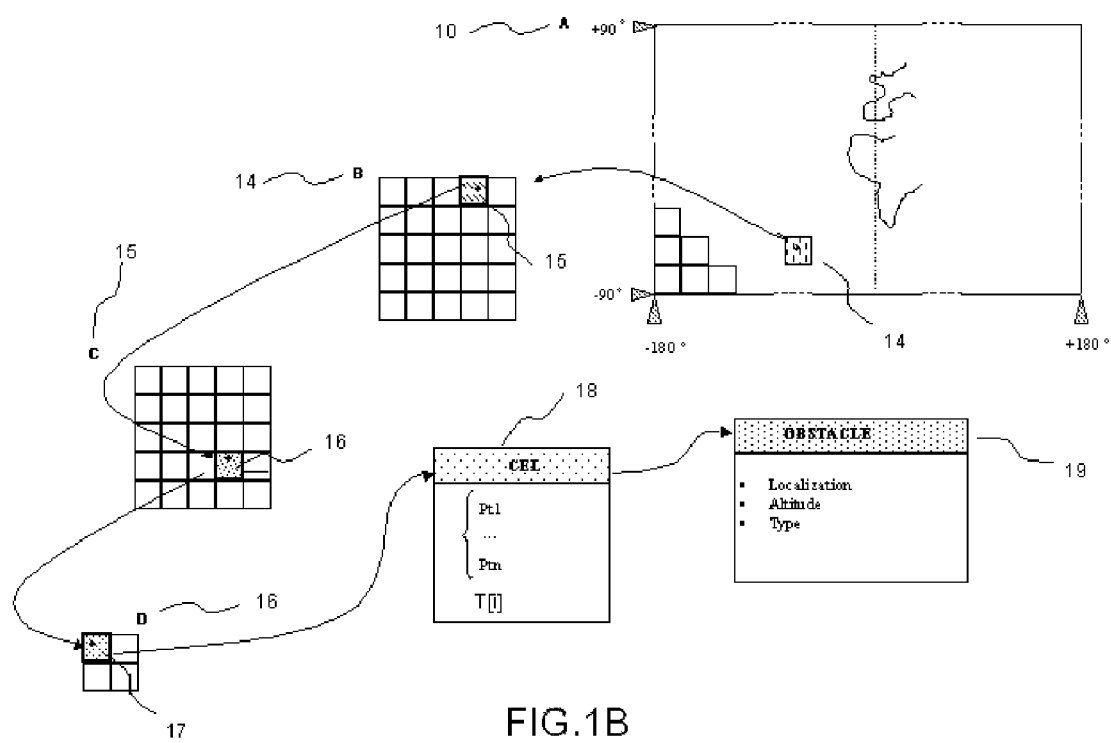
FIG. 1B: the N-ary diagram of the obstacles coming from the topographical and obstacle database.

FIG. 1B shows an example of the structure of an N-ary tree. An area 10, denoted A, is decomposed into 72×36 regions, each of the regions 14, denoted B, being of square shape whose side is 5° in latitude and in longitude. This region 14 is subdivided into a square area of 5×5 regions 15, denoted C, of square shape whose sides are 1° in latitude and in longitude. Each region 15 is subdivided into a square area of 5×5 regions 16, denoted D, of square shape whose sides are 12 minutes in latitude and in longitude. Each region 16 is subdivided into a square area of 2×2 regions 17, of square shape whose sides are 6 minutes.

Each region 17 is one cell 18; this corresponds to one leaf of the N-ary tree and takes the set of attributes previously described.

According to the method of the invention, the information T[i] is one attribute of each cell 18.

Each cell 18 comprises a set of points representing the obstacles in the area in question. Each obstacle is referenced notably according to a localization, an altitude and a type in the data base.

A collection of obstacle descriptions generally includes their position, their type, notably towers, bridges or cranes, their dimensions and their attributes, notably whether the obstacles are illuminated or under construction, for example.

When extrapolated trajectories are calculated, they are correlated with the presence of obstacles, within a given area situated in front of the aircraft, notably with their density such as was previously defined.

If a collision is predicted, then a warning with an appropriate danger level is transmitted to the crew.

In order to avoid too great a number of warnings in an urban environment due to the large number of obstacles situated on extrapolated trajectories, the duration $T_{CLIMB}$ required for the calculation of the extrapolated trajectories of the aircraft may be reduced; in this case, it is then called $T_{CLIMB\_REDUCED}$.

One embodiment allows the duration $T_{CLIMB}$ to be reduced as a function of the value of the Boolean variable T[i].

Figure 2:
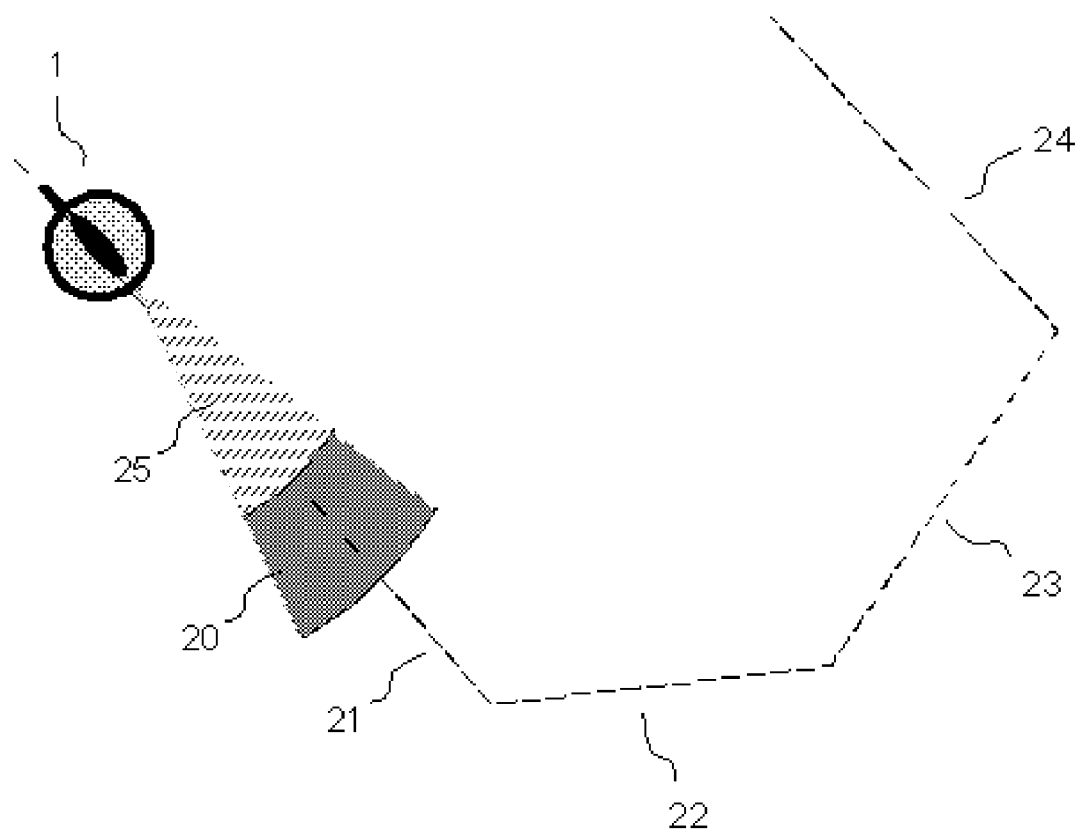
FIG. 2: the superimposition of topographical data and of the extrapolated trajectories.

FIG. 2 illustrates, at each moment in time, the cone 20 covering the areas representing the topographical data in the database which are correlated with the extrapolated trajectories of the aircraft 1. When the heading 21 is maintained, the cone 20 is substantially symmetrical with respect to the heading of the aircraft.

The method according to the invention proposed that the time, notably $T_{CLIMB}$, during which the extrapolated trajectories are calculated, be reduced. The correlation area of these trajectories with the cone representing the topographical data, notably obstacles, is then reduced. The probabilities that the extrapolated trajectories encounter an obstacle are therefore reduced.

For this purpose, the area 25, smaller than the area 20, represents the range of the extrapolated trajectories calculated with a shorter duration $T_{CLIMB\_REDUCED}$ than the duration $T_{CLIMB}$.

The warnings generated and associated with the risk of encountering an obstacle within the cone 25 are therefore fewer in number and reduce the nuisance problem caused by the generation of too large a number of warnings within an urban environment.

Figure 3:
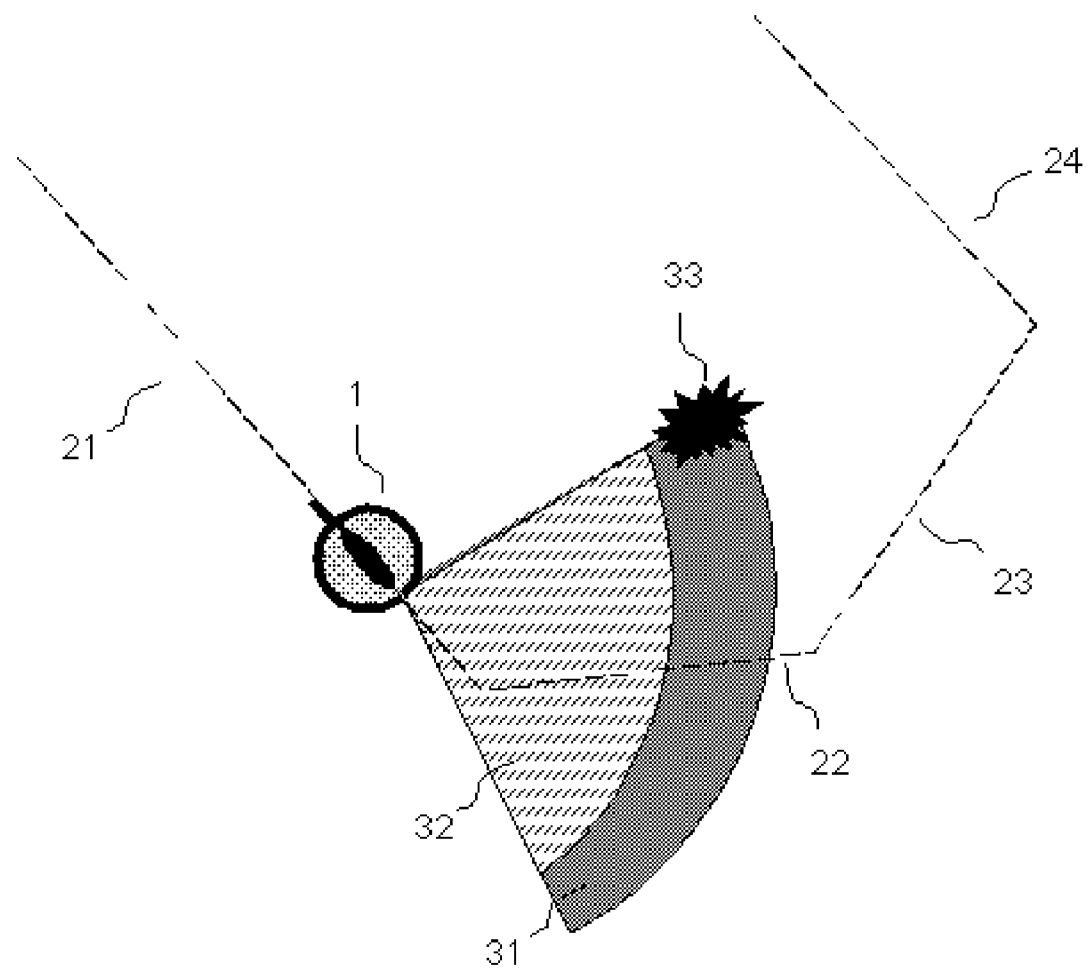
FIG. 3: the superimposition of topographical data and of the extrapolated trajectories in the case of a turn manoeuvre.

FIG. 3 illustrates, when the aircraft 1 begins a turn in order to go from a first heading 21 to a second heading 22, the cone 31 covering the areas comprising topographical data from the database.

The cone 31 and its orientation, in the case of a turn, are calculated in such a manner as to anticipate the analysis of the data most critical for the aircraft, in other words on the inside of the turn.

There is indeed a greater risk of encountering obstacles in the part of the airspace where the aircraft is headed than in the other direction. The cone 31 is no longer symmetrical with respect to the instantaneous heading, since the anticipation of the turn path makes the analysis cone 31 for the topographical data deviate towards the inside of the turn circle.

In the case of a turn, the method according to the invention allows the trajectories extrapolated in a reduced cone 32 to be analysed owing to the reduction of the duration $T_{CLIMB}$ in question, since the cone 32 is, in part, superimposed, according to a first radius, onto the cone of the topographical data.

By way of example, FIG. 3 shows an obstacle 33 that is not situated on the real trajectory of the aircraft, the real trajectory being composed of four segments 21, 22, 23, 24. The method according to the invention allows the duration $T_{CLIMB}$ to be adjusted as a function of the obstacle density, such as was previously defined, in the area 31 in such a manner as to calculate the potential extrapolated trajectories, and hence the range of the cone 32 relating to the extrapolated trajectories of the aircraft to be defined.

In this example, if the extrapolated trajectories were calculated in the cone 31, and analysed by a computer on the aircraft, since the obstacle 33 is identified in the topographical database, the crew would be informed of a risk of collision. An alarm would then be transmitted to the crew, however it would not constitute a real danger in view of the trajectory that the aircraft is going to follow.

By considering the trajectories included in the cone 32, the obstacle identified in the database comprising the information relating to the topology of the terrain and to the presence of obstacles is not covered by their range. No alarm is then emitted and does not distract the crew.

Figure 4:
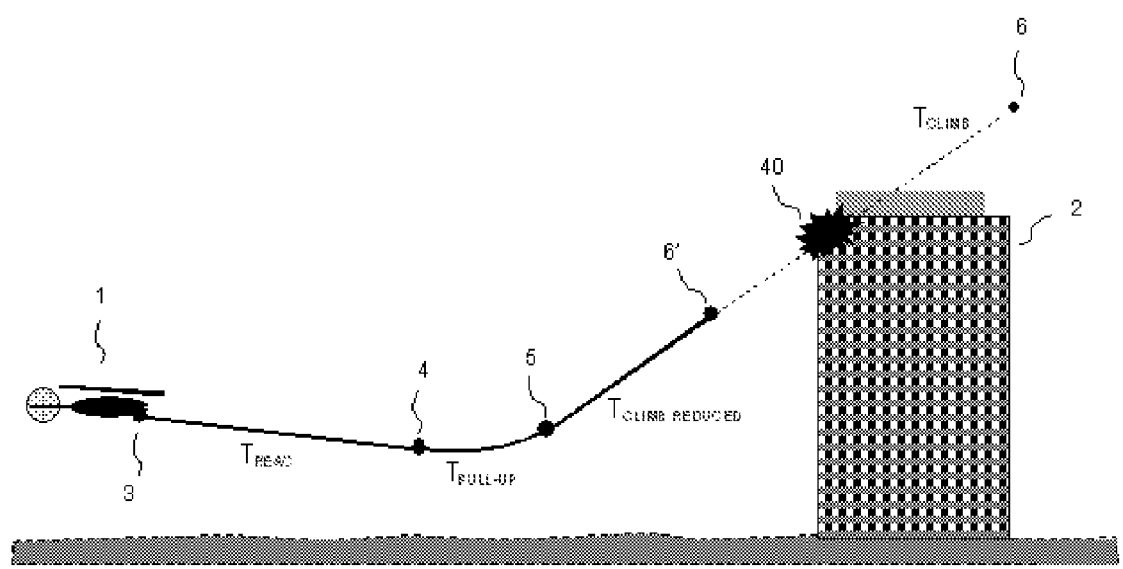
FIG. 4: the extrapolated trajectory of an aircraft considering a reduced duration $T_{CLIMB\_REDUCED}$.

FIG. 4 shows an extrapolated trajectory of the aircraft whose segment included between the position 5 corresponding to the start of the climb and the position 6' corresponding to the position on the extrapolated trajectory furthest away from the aircraft is calculated with a reduced duration $T_{CLIMB\_REDUCED}$. These positions are calculated using the instantaneous ground speed of the aircraft.

In this latter case, the presence of the obstacle 2 is not therefore transmitted to the crew in the form of an alarm. In view of the margin for manoeuvring and reaction contained within the first segment of the extrapolated trajectory based on the time $T_{REAC}$, this margin can be sufficient under urban flight conditions.

The crew is not therefore warned of a potential collision 40, which does not represent an imminent danger, in view of the fact that, in an urban context, this alarm constitutes a distraction for the crew.

The method according to the invention advantageously allows the ground speed of the aircraft to be taken into account in order to weight the time $T_{CLIMB}$ allowing the last portion of the extrapolated trajectories to be calculated.

In one embodiment, the method according to the invention advantageously allows the mean rate of changes of heading of the aircraft within a settable time period, for example the last 20 seconds of flight of the aircraft, to be taken into account.

The variable corresponding to the rate of changes of heading can be obtained by considering the differences in lateral speeds of the aircraft within a lapse of time passed.

If the aircraft has carried out numerous changes of heading, its manoeuvrability will enable it to avoid obstacles more easily and, in this case, $T_{CLIMB}$ can be reduced in order to calculate the last portions of extrapolated trajectories.

In contrast, if the aircraft has carried out no or few changes of heading within a lapse of time preceding the calculation of the extrapolated trajectories, then it is not necessary to reduce the time $T_{CLIMB}$.

Advantageously, a certain number of parameters may be involved in the calculation of the duration $T_{CLIMB}$, such as the ground speed of the aircraft, the density of obstacles within a given perimeter or even the rate of changes of heading of the aircraft.

In one embodiment, a coefficient is considered that weights the time $T_{CLIMB}$ currently fixed and that does not depend on any parameter.

For example, one embodiment proposes that this coefficient be defined in such a manner as to produce a linear expression, such that:

$T_{CLIMB\_REDUCED} = C \cdot T_{CLIMB}$, with $$C = \left[ \left( \prod_{i=1}^{n} (1+C_i)^{\alpha_i} \right) \frac{1}{\sum_{i=1}^{n} \alpha_i - 1} \right]$$

where $C_i$ are coefficients in the range between 0 and 1, relating to each parameter taken into account for weighting the time $T_{CLIMB}$, such as the ground speed, the obstacle density such as was previously defined or, alternatively, the mean rate of changes of heading;

and, $\alpha_i$ is a power applied to each of the normalized coefficients which depends on the importance of the influence of a parameter that it is desired to favour with respect to the other parameters.

Figure 5:
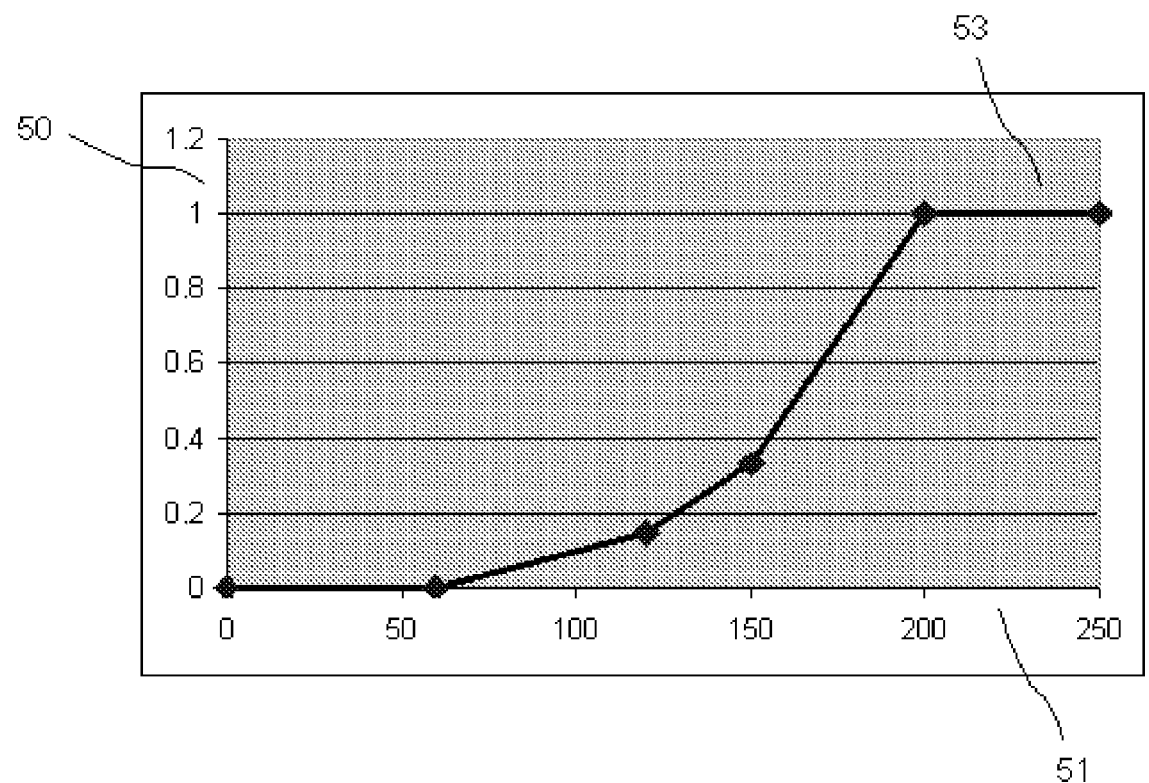
FIG. 5: the weighting coefficients of the duration $T_{CLIMB}$ as a function of the ground speed of the aircraft.

FIG. 5 shows a variation law for the coefficient $C_i$ as a function of the ground speed of an aircraft. The curve 53 is linear in parts. The axis 51 defines the ground speed expressed in knots and the axis 50 represents the various values of the coefficient $C_i$ relating to the influence of the ground speed in the calculation of the extrapolation of the trajectories.

The higher the ground speed of the aircraft, the greater the coefficient $C_i$ and the smaller the influence on the weighting of the time $T_{CLIMB}$.

Indeed, an aircraft having a low ground speed has the capability of reacting more quickly when faced with an obstacle. In contrast, if a risk of collision is predictable, an aircraft with a high ground speed has a reduced margin for manoeuvring in order to avoid an obstacle owing to its inertia. In this latter case, the duration $T_{CLIMB}$, which proves to be a safety feature, need not be reduced.

Figure 6:
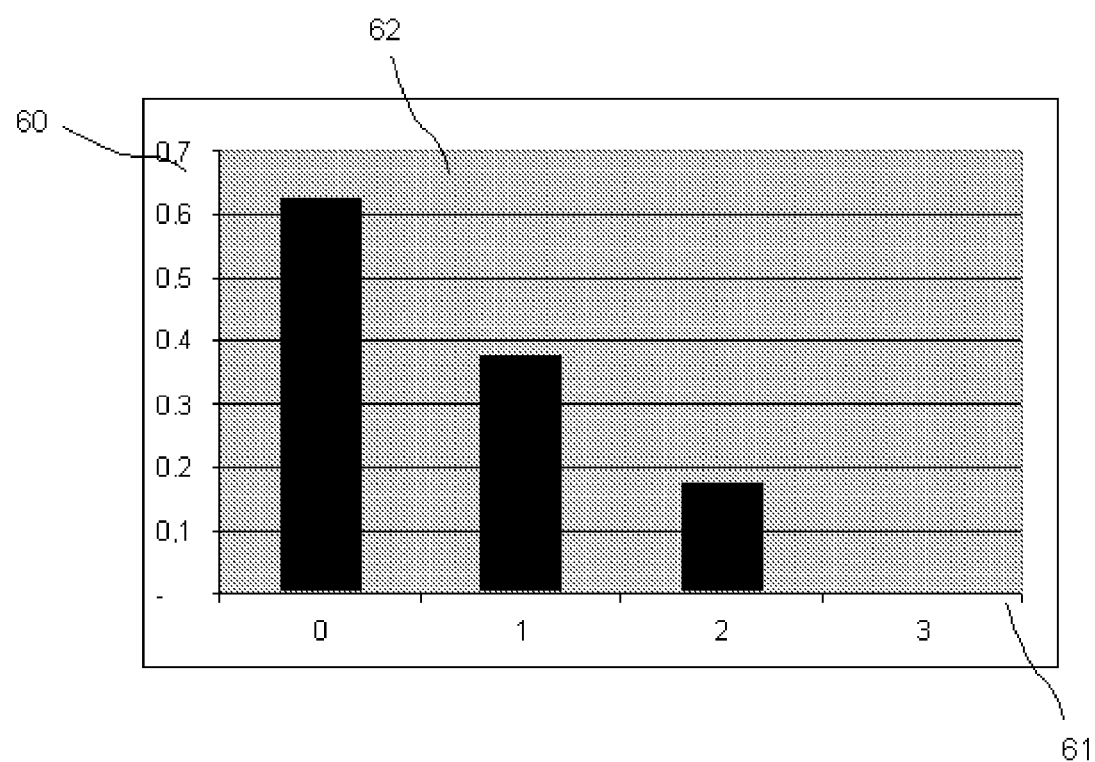
FIG. 6: the weighting coefficients of the duration $T_{CLIMB}$ as a function of the obstacle density in one area of the terrain.

FIG. 6 shows a histogram 62 of obstacle densities T[i] in various areas. The axis 60 represents the various values of the weighting coefficient $C_i$ associated with the variable relating to the density of obstacles in one or more areas located in front of the aircraft. The axis 61 represents the various categories of areas defined according to their density of obstacles. In this example, they comprise four levels of obstacle density. The area 0 is an area of high density of obstacles and the obstacle density in the area 3 is low or even zero. Since the risk of collision increases with the number of obstacles, the duration $T_{CLIMB}$ must not be reduced, or reduced by very little, in view of the danger, for example in the case of an area of level 0 located in front of the aircraft. The coefficient applied in the example is then close to 1 and has little influence on the weighting of the time $T_{CLIMB}$.

In contrast, when the obstacle density is low, the value of the coefficient $C_i$ can be small and the weighting of the time $T_{CLIMB}$ more significant.

Figure 7:
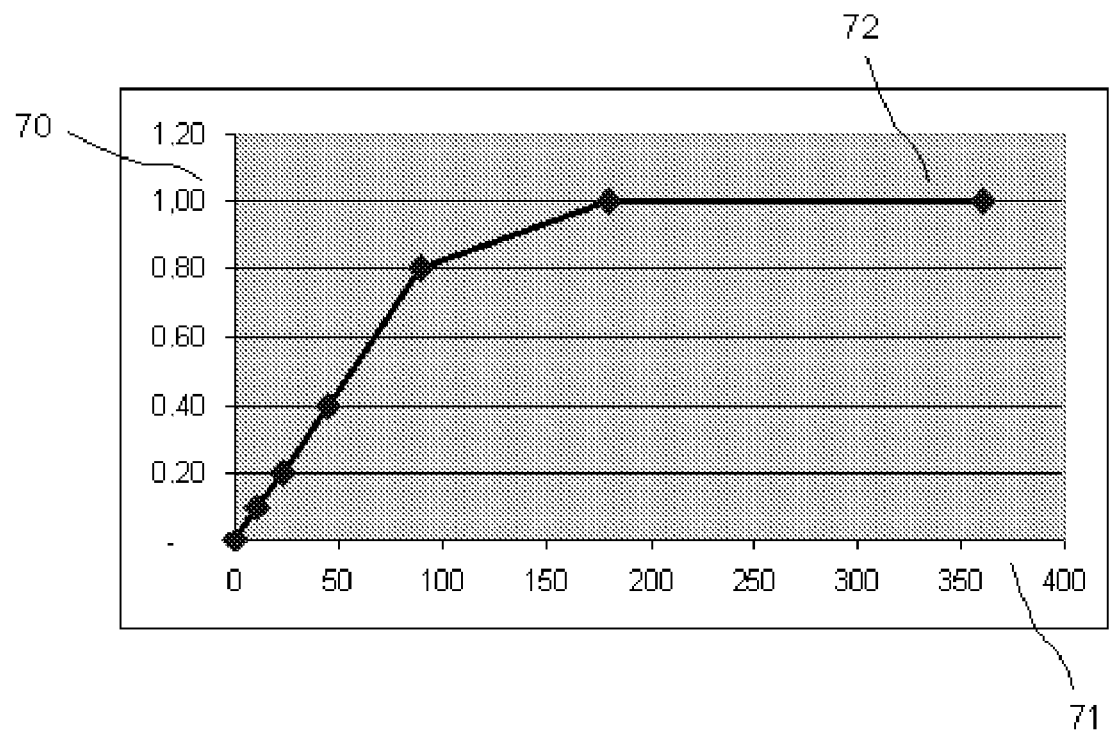
FIG. 7: the weighting coefficients of the duration $T_{CLIMB}$ as a function of the rate of changes of heading of the aircraft.

FIG. 7 shows the curve 72 of the mean rate of changes of heading carried out by the aircraft within the last 20 seconds of flight. The axis 71 represents the number of changes of heading, and the axis 70 the various values of the coefficient $C_i$ relating to this parameter. When the aircraft has made a large number of turns within the last 20 seconds, its flight profile reflects a flexibility and a manoeuvrability of the aircraft that allows an obstacle avoidance manoeuvre to be planned that does not require a high predictability of the trajectories.

Advantageously, one embodiment according to the method of the invention allows the weight of the aircraft to be taken into account as a parameter weighting the calculation of the reduction of the duration $T_{CLIMB}$.

Advantageously, another embodiment according to the method of the invention allows the altitude measured by the radioaltimeter of the aircraft to be taken into account as another data value weighting the time $T_{CLIMB}$.

Advantageously, another embodiment according to the method of the invention allows the height with respect to the terrain to be taken into account, the data on the terrain coming from the topographical database. A coefficient $C_i$ relating to this parameter then weights the time $T_{CLIMB}$.

Finally, a parameter such as the result of the calculations of distance with respect to points referenced in the topographical database can weight the time $T_{CLIMB}$.

The main advantage of the invention is to adapt the calculation of the duration of the extrapolated trajectories as a function of parameters relating to the safety of the aircraft or of its flight profile or of external parameters.

Since the time period taken for the calculation of the extrapolated trajectories is reduced or not reduced depending on the various flight conditions of an aircraft, the alarms relating to the anti-collision function are accordingly naturally filtered and do not interfere with the crew in certain situations.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. Anti-collision method for aircraft, the aircraft includes:
   means for calculating the speed of the aircraft;
   means for calculating extrapolated positions of at least one trajectory of the aircraft, the said extrapolated positions being calculated for a fixed maximum time period, called extrapolation time; and
   a topographical database of the terrain and of the obstacles, the said database comprising, within a given perimeter, obstacle density data;
   Where said method comprises the calculation of a weighting coefficient for the extrapolation time of the extrapolated trajectories of the aircraft as a function of data on obstacle density within a given perimeter.

2. Method according to claim 1, wherein the calculation of the weighting coefficient of the extrapolation time comprises the determination of a height of the obstacles greater than a pre-determined minimum height.

3. Method according to claim 1, wherein the calculation of trajectory extrapolated positions of the aircraft over the extrapolation time comprises an estimation of at least three successive positions of the aircraft, of which:
   a first position is determined by considering a first fixed time for reaction of the crew, a ground speed of the aircraft and a first heading;
   a second position is determined as a function of a second period of time required in order to change the first heading of the aircraft towards a second heading;
   and a third position is determined at a fixed heading for a third period of time referred to as climb duration.

4. Method according to claim 3, wherein, when an upper threshold for the density of obstacles is exceeded, a reduced climb duration is calculated from the product of the weighting coefficient and the third climb time.

5. Method according to claim 3, wherein the weighting coefficient is a function of the ground speed of the aircraft.

6. Method according to claim 3, wherein the weighting coefficient is a function of the differences in vertical speeds of the aircraft observed within a second fixed time period.

7. Method according to claim 6, wherein the second time period is around twenty seconds.

8. Method according to claim 3, wherein the weighting coefficient is a function of the height of the aircraft with respect to the ground.

9. Method according to claim 3, wherein the weighting coefficient is a function of the proximity of reference positions of obstacles identified from the topographical database.

10. Method according to claim 4, wherein the reduced duration is expressed in the following manner:

$T_{CLIMB\_REDUCED} = C \cdot T_{CLIMB}$, where C is the weighting coefficient.

11. Method according to claim 10, wherein the weighting coefficient for the reduced duration is expressed in the following manner:

$$C = \left[ \left( \prod_{i=1}^{n} (1 + C_i)^{\alpha_i} \right) \frac{1}{\sum_{i=1}^{n} \alpha_i} - 1 \right]$$

where the coefficients $C_i$ are coefficients in the range between 0 and 1, relating to each parameter taken into account for weighting the third time period, and the coefficients $\alpha_i$ are powers applied to each of the normalized coefficients which relate to the importance of the influence of a parameter that it is desired to favour with respect to the other parameters.

* * * * *